United States Patent
Gasdaska et al.

[11] Patent Number: 6,131,797
[45] Date of Patent: Oct. 17, 2000

[54] METHOD FOR JOINING CERAMIC TO METAL

[75] Inventors: Charles Gasdaska, Ogdensburg, N.J.; Edward V. Limoncelli, Clinton, Conn.

[73] Assignee: AlliedSignal Inc., Morristown, N.J.

[21] Appl. No.: 09/193,031

[22] Filed: Nov. 16, 1998

[51] Int. Cl.[7] ............................. B23K 35/28; B23K 31/12
[52] U.S. Cl. .................... 228/122.1; 228/124.7; 228/189; 228/262.7
[58] Field of Search ................. 228/122.1, 124.7, 228/141.1, 173.5, 164, 188, 189

[56] References Cited

U.S. PATENT DOCUMENTS

| | | | |
|---|---|---|---|
| 3,921,616 | 11/1975 | Kish | 125/11 |
| 4,606,978 | 8/1986 | Mizuhara | 428/606 |
| 4,723,862 | 2/1988 | Ito et al. | 403/272 |
| 4,798,320 | 1/1989 | Fang . | |
| 4,989,773 | 2/1991 | Ishiyama | 228/122 |
| 4,991,991 | 2/1991 | Ito et al. . | |
| 5,001,019 | 3/1991 | Ito et al. . | |
| 5,073,085 | 12/1991 | Ito et al. . | |
| 5,076,484 | 12/1991 | Ito et al. . | |
| 5,186,380 | 2/1993 | Beeferman et al. | 228/121 |
| 5,234,152 | 8/1993 | Glaeser | 228/121 |
| 5,340,012 | 8/1994 | Beeferman et al. | 228/56.3 |
| 5,372,298 | 12/1994 | Glaeser | 228/195 |
| 5,461,898 | 10/1995 | Lessen | 72/256 |

OTHER PUBLICATIONS

S. L. Semiatin. Metals Handbook: Ninth Edition vol. 13; Forming and Forging 237–238.

*Primary Examiner*—Patrick Ryan
*Assistant Examiner*—Jonathan Johnson
*Attorney, Agent, or Firm*—William J. Zak, Jr., Esq.

[57] ABSTRACT

Metal and ceramic members are joined together by a braze joint including a member made of bar stock molybdenum, a first ductile member brazed between the molybdenum member and the metal member, and a second ductile member brazed between the molybdenum member and the ceramic member. The braze joint may be used to join a ceramic wheel shaft to a metal shaft in a turbomachine. The braze joint allows torsion to be transmitted between the ceramic wheel shaft and the metal shaft without the use of a metal sleeve.

19 Claims, 2 Drawing Sheets

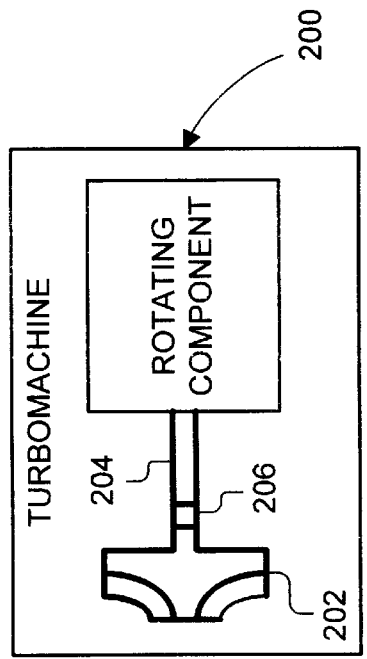
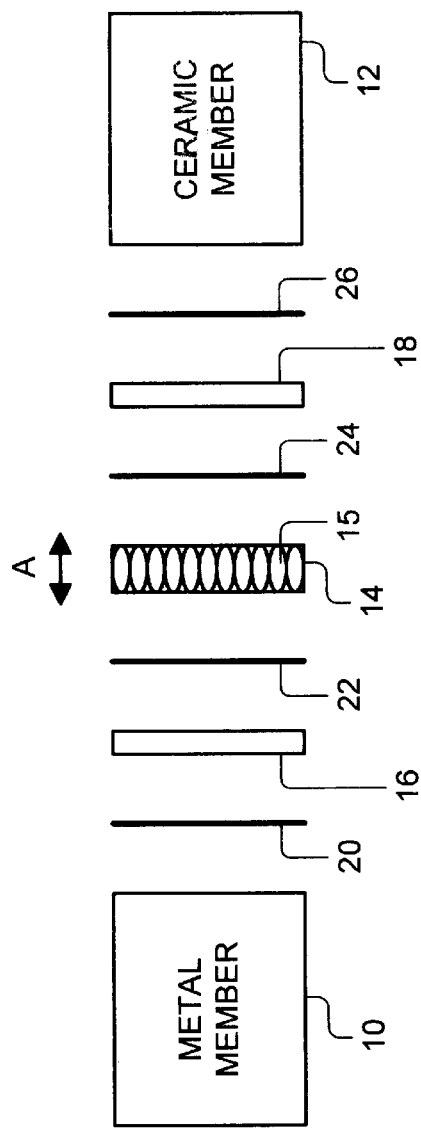
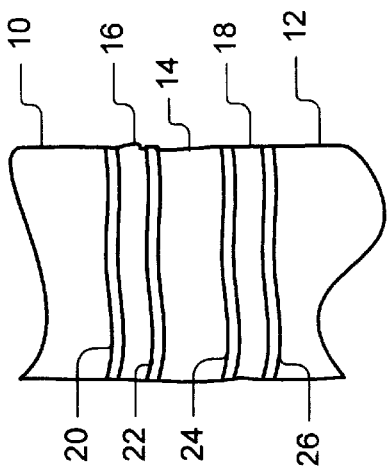

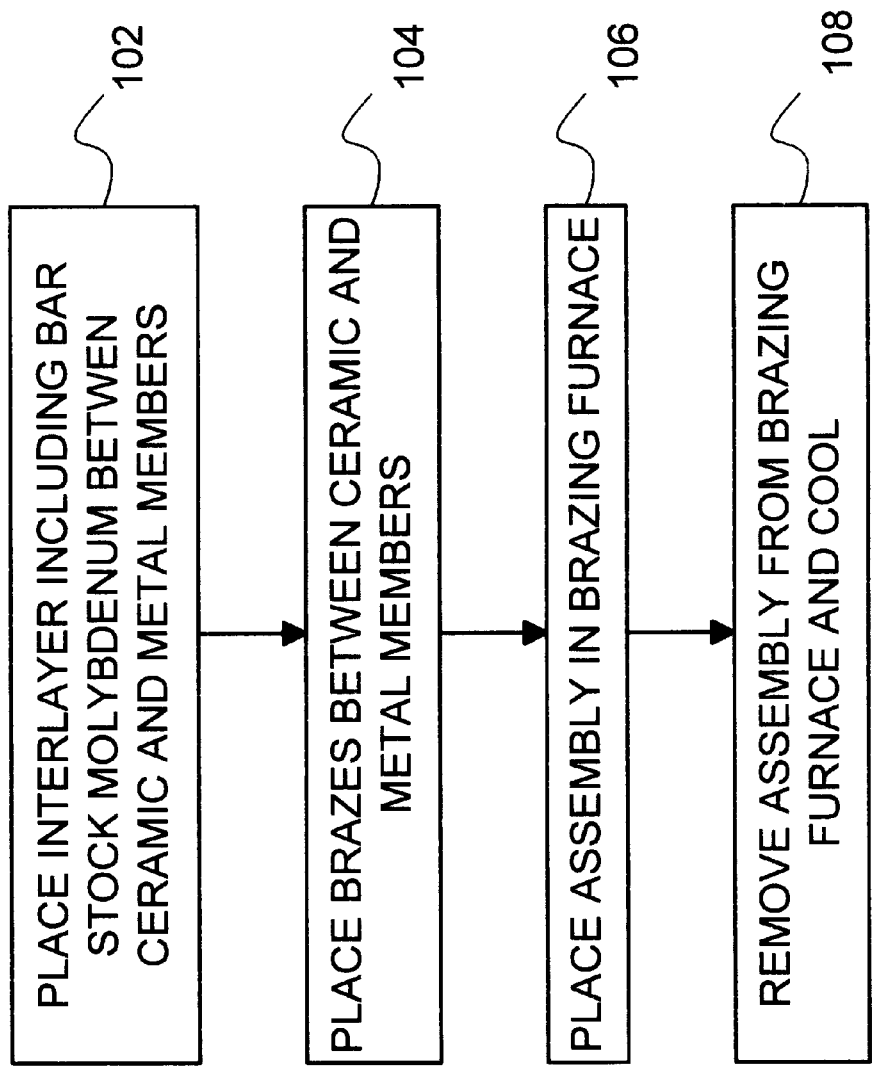

METHOD FOR JOINING CERAMIC TO METAL

BACKGROUND OF THE INVENTION

The present invention relates generally to a method of joining ceramic to metal and specifically to a method of creating a ceramic-metal interface that allows torsion loads to be transmitted between a ceramic member and a metal member. The invention also relates to turbomachinery including metal and ceramic rotating components that are joined together.

One of the more difficult problems of joining ceramic to metal is overcoming the large difference in thermal expansion between the metal and the ceramic. In particular, a ceramic such as silicon nitride has a low thermal expansion as compared to a steel or nickel alloy.

Interlayer materials including tungsten alloys have been used to overcome the difference in thermal expansion. The interlayer materials reduce residual stresses produced by the large, differences in thermal shrinkage upon cooling after brazing.

In an automotive turbocharger including a ceramic turbine wheel that is brazed to a metal shaft, a metal sleeve is used to cover the braze joint. The metal sleeve is typically made of a special low thermal expansion metal alloy that avoids the introduction of unwanted residual stresses in the ceramic. The metal sleeve protects the braze joint from high temperatures, and it protects the braze joint from cracking under high bending and twisting loads. The metal sleeve also provides a sealing surface. (A ceramic shaft of the turbine wheel extends from a hot side of the turbocharger, through a seal, to a cooled side. However, it is undesirable to form a seal on a brittle ceramic shaft.) Additionally, the metal sleeve itself can provide additional bonding, as is the case where the ceramic shaft is press-fitted into the metal sleeve.

However, special metal alloys used for the metal sleeve are expensive and they are not readily available. Furthermore, precision machining of the ceramic and metal mating surfaces is performed to avoid the introduction of unwanted stresses and, in the case of press-fitting, to ensure that the mating surfaces remain in contact throughout the operating temperature range of the machine. The sleeve also makes a post-brazing inspection of the braze joint difficult to perform. These problems are especially important to mass production items such as automotive turbochargers.

Furthermore, brazing is often performed in two steps when a metal sleeve is involved. The addition of a second step adds to the cost and complexity of joining the metal to the ceramic.

Even when a metal sleeve is not involved, some brazing operations are performed in two steps. The metal is brazed separately from the ceramic to prevent a migration of braze material between layers that might otherwise occur during brazing of multiple materials. The migration could cause a change in composition and properties of the braze and thereby have a deleterious affect on strength of the joint.

There is a need to join metal to ceramic in a single brazing step. In applications involving the transmission of large torsion loads, there is also a needed to create a high strength, sleeveless braze joint.

SUMMARY OF THE INVENTION

The present invention may be regarded as a braze joint that allows torsion loads to be transmitted between metal and ceramic turbomachine components. An interlayer is placed between a metal member and a ceramic member. The interlayer includes ductile members and a molybdenum member of the bar stock type. The ductile members are joined (e.g., brazed) to the molybdenum member, and the ductile members are brazed to the metal and ceramic members. If the ductile members are also brazed to the molybdenum member, the braze joint can be formed in a single brazing step. The braze joint is sleeveless, which eliminates the need for low-expansion sleeve metals that are expensive and hard to procure.

BRIEF DESCRIPTION OF THE DRAWINGS

FIG. 1 is an illustration of a metal member, a ceramic member and an interlayer prior to brazing;

FIG. 2 is a flowchart of a method of joining the metal member, the ceramic member and the interlayer;

FIG. 3 is an illustration of a braze joint after brazing, the braze joint having been created in accordance with the method shown in FIG. 2; and FIG. 4 is an illustration of a turbomachine including a ceramic wheel that is joined to a metal shaft in accordance with the method shown in FIG. 2.

DESCRIPTION OF THE PREFERRED EMBODIMENT

Reference is made to FIGS. 1 and 2, which illustrate the joining of a metal member 10 to a ceramic member 12. The surfaces of the members 10 and 12 to be joined will be referred to as "joinable" surfaces.

An interlayer is placed between the joinable surfaces of the metal and ceramic members 10 and 12 (block 102). The interlayer includes a molybdenum member 14 and first and second ductile members 16 and 18 made of nickel. The first nickel member 16 is located between the molybdenum member 14 and the joinable surface of the metal member 10. The second nickel member 18 is located between the molybdenum member 14 and the joinable surface of ceramic member 12.

The nickel members 16 and 18 each have thickness between 0.005 inches and 0.100 inches (e.g., 0.030 inches). Each nickel member 16 and 18 may have the same diameter as the metal and ceramic members 10 and 12.

The molybdenum member 14 may be machined from molybdenum bar stock, such as that corresponding to ASTM B387-90. Bar stock molybdenum, which is extruded, has crystals that are elongated in a preferred orientation. Thus, the molybdenum member 14 has crystals 15 that extend along a preferred orientation or crystal axis A (the size of the crystals 15 in FIG. 1 is exaggerated merely to illustrate the preferred crystal orientation). The crystal axis A of the molybdenum member 14 is perpendicular to the joinable surfaces of the metal and ceramic members 10 and 12, as shown in FIG. 1. Such an orientation of the crystal axis A minimizes the stress (caused by bending and twisting) at the crystal boundaries of the molybdenum member 14. Thus, the crystals 15 of the molybdenum member 14 are aligned in an orientation A that reduces the chances of separation (cracking) due to twisting and bending.

The molybdenum member 14 may have a thickness of at least 0.005 inches. Maximum thickness of the molybdenum member 14 is limited by practical considerations (e.g., size constraints imposed by a turbomachine). The molybdenum member 14 may have the same diameter as the metal and ceramic members 10 and 12. The molybdenum member 14 may also be cleaned and plated with nickel metal having a thickness between 0.000050 and 0.000100 inches.

Brazes 20 to 26 are then placed between the metal and ceramic members 10 and 12 (block 104). A first braze 20 is placed between the metal member 10 and the first nickel member 16; a second braze 22 is placed between the first nickel member 16 and the molybdenum member 14; a third braze 24 is placed between the molybdenum member 14 and the second nickel member 18; and a fourth braze 26 is placed between the second nickel member 18 and the ceramic member 12. Each braze 20 to 26 includes copper and silver.

An active metal such as titanium may be included in each braze 20 to 26. For example, the titanium may be coated onto a silver-copper braze foil. Although the titanium is not required for metal-to-metal brazing, there are advantages to using the titanium in metal-to-metal interfaces and ceramic-to-metal interfaces. The titanium provides good wetting and bonding. In contrast, titanium-free brazes that are brazed in a single assembly might become very thin, due to flow of the braze into interfaces containing titanium.

Preferred amounts of silver, copper and titanium per percentage weight for each braze 20 to 26 are shown below in Table 1. Preferred thickness in thousandths of an inch for each braze 20 to 26 before brazing is also shown in Table 1 (the braze thickness does not include the thickness of a titanium coating). Ranges of percentage weights and thickness are shown in parentheses.

TABLE 1

| Braze | Joined | Braze Composition in weight % | | | Thickness in mils |
| --- | --- | --- | --- | --- | --- |
| | | Ag | Cu | Ti | |
| 20 | metal member 10 & 1st Ni member 16 | 69 (67.7 to 71) | 27 (26.3 to 27.5) | 4.0 (1.5 to 6) | 3 (3 to 6) |
| 22 | 1st Ni member 16 & moly member 14 | 71 (68.4 to 71) | 27.5 (26.6 to 27.5) | 1.5 (1.5 to 5) | 8 (5 to 10) |
| 24 | Moly member 14 & 2nd Ni member 18 | 71 (68.4 to 71) | 27.5 (26.6 to 27.5) | 1.5 (1.5 to 5) | 8 (5 to 10) |
| 26 | 2nd Ni member 18 & ceramic member 12 | 69 (67.7 to 69.8) | 27 (26.3 to 27.2) | 4.0 (3 to 6) | 6 (3 to 8) |

The first and fourth brazes 20 and 26 may each include a single silver-copper braze foil (e.g., BVAg 8, AWS 5.8) that is coated with titanium. The second and third braze foils 22 and 24 may each include the following two braze foils to obtain the desired thickness and lower titanium content: a silver-copper braze foil (e.g., BVAg 8, AWS 5.8) and a silver-copper braze foil (e.g., BVAg 8, AWS 5.8) coated with titanium.

The metal member 10, the ceramic member 12, the molybdenum member 14, the nickel members 16 and 18 and the brazes 20 to 26 may be assembled using standard brazing cements and fixtures (block 104). This assembly may be placed in axial compression at a low level (e.g., 2.5 psi).

The assembly is placed in a controlled atmosphere furnace, where brazing is then carried out in a single step (block 106). For example, the brazing step may be carried out under vacuum at a brazing temperature between 840° C. and 950° C. for between five and thirty minutes. The brazing causes the brazes 20 to 26 to melt. The assembly is removed from the furnace and allowed to cool to room temperature (block 108).

The presence of titanium in each braze 20 to 24 limits the migration of braze during the brazing operation. Small amounts of braze might migrate and wet the sides of the molybdenum or nickel interlayer members 14, 16 and 18. Consequently, the braze joint might exhibit a range of thickness after brazing.

Reference is now made to FIG. 3, which illustrates the metal member 10, the ceramic member 12 and the interlayer after brazing. FIG. 3 is merely an illustration; the layers are not shown to scale. For the brazes 20 to 26 and members 14 to 18 described in Table 1 and joined as described above, the first braze 20 will have a thickness of between about 0.003 and 0.006 inches after brazing, the second and third brazes 22 and 24 will each have a thickness of between about 0.005 and 0.008 inches after brazing, and the fourth braze 26 will have a thickness of about 0.006 to 0.010 inches after brazing.

The thicker braze layers at the molybdenum-nickel and ceramic-nickel interfaces allow for additional stress relief during cooling from the brazing temperature. Ceramic-metal interfaces and molybdenum-metal interfaces experience larger stresses during cooling after braze solidification due to the larger difference in thermal expansion coefficient and limited ductility of these materials.

Thus disclosed is a method of creating a braze joint that is strong under bending and torsion. The molybdenum member 14 provides a high elastic modulus, low thermal expansion buffer between the metal member 10 and the ceramic member 12. The crystal axis of the molybdenum member 14 is oriented such that the boundaries are relatively stress-free during torsion and bend loading of the joined metal and ceramic members 10 and 12. The molybdenum member 14 may be plated with nickel to enhance wetting and flow of braze and to provide a clean surface for brazing.

The braze joint may be formed in a single brazing step instead of two steps. The use of a single step reduces cost and complexity of joining the metal to the ceramic.

The method of joining metal to ceramic may be applied to different types of turbomachines having rotating ceramic and metal components. For example, FIG. 4 shows a turbomachine 200 having a ceramic wheel 202 that is joined to a metal shaft 204 by a braze joint 206 created according to the method described above. The wheel 202 may be made of a ceramic such as silicon nitride, and the shaft 204 may be made of a high temperature alloy such as Monel K500 or a hardened steel such as 4340 steel.

In a turbomachine such as an automotive turbocharger, the braze joint can transmit high torque loads without the use of a metal sleeve. This eliminates problems such as procuring special, hard-to-find metal alloys used for the sleeve. Eliminating the sleeve reduces the need for precision machining of ceramic and sleeve mating surfaces. Eliminating the sleeve also reduces the cost of sleeve material, and it makes braze joint inspection easier to perform.

The present invention is not limited to the specific embodiments disclosed above. The composition of the metal member 10 steel is not limited to Monel K500 or 4340 steel, and the composition of the ceramic member 12 is not limited to silicon nitride The molybdenum member 14 could be plated with a material other than nickel. For example, the molybdenum member 14 could be plated with nickel-copper or another plating material that is compatible with molybdenum.

The brazes 20 to 26 are not limited to copper-silver-titanium materials. For example, copper-silver-indium-titanium brazes may be used instead.

The nickel members 16 and 18 can be joined to the molybdenum member 14 in ways other than brazing.

Moreover, the ductile members 16 and 18 are not limited to a nickel composition. Rather, the ductile members 16 and 18 may be made of any other metal that can be joined to the molybdenum member 14, that can be joined to the metal and ceramic members 10 and 12, and that can provide suitable stress relief during large thermal expansion differences between the metal, ceramic and molybdenum members 10, 12 and 14.

Thus, the present invention is not limited to the specific embodiments disclosed above. Instead, the present invention is construed according to the claims that follow.

What is claimed is:

1. A method of joining a metal member to a ceramic member, the method comprising the steps of:
   interposing an interlayer between joinable surfaces of the metal and ceramic members, the interlayer including a molybdenum member and first and second ductile members, the molybdenum member being located between the metal and ceramic members, the first ductile member being located between the molybdenum member and the metal member, the second ductile member being located between the molybdenum member and the ceramic member, the molybdenum member being of a bar stock type;
   joining the first and second ductile members to the molybdenum member; and
   brazing the first and second ductile members to the metal and ceramic members, respectively.

2. The method of claim 1, wherein the first and second ductile members are joined to the molybdenum member by brazing, and wherein the joining and the brazing both include heating steps that are performed at the same time.

3. The method of claim 2, wherein the joining and the brazing are performed by the steps of:
   placing a first braze between the first ductile member and the joinable surface of the metal member;
   placing a second braze between the first ductile member and the molybdenum member;
   placing a third braze between the molybdenum member and the second ductile member;
   placing a fourth braze between the second ductile member and the joinable surface of the ceramic member; and
   heating the interlayer and the first, second, third and fourth brazes together at a brazing temperature.

4. The method of claim 3, wherein the ductile members are made of nickel, and wherein each braze includes silver, copper and titanium.

5. The method of claim 4, wherein the first and fourth brazes each include about 69% silver, about 27% copper and about 4% titanium by weight, and wherein the second and third brazes each include about 71% silver, about 27.5% copper and about 1.5% titanium by weight.

6. The method of claim 4, wherein the first braze has a pre-brazing thickness of about 0.003 inches, the second and third brazes each have a pre-brazing thickness of about 0.008 inches, and the fourth braze has a pre-brazing thickness of about 0.006 inches.

7. The method of claim 1, wherein a crystal axis of the molybdenum member is perpendicular to the joinable surfaces of the metal and ceramic members.

8. The method of claim 1, wherein the molybdenum member has a thickness of at least 0.005 inches.

9. The method of claim 1, wherein the molybdenum member is nickel-plated.

10. The method of claim 9, wherein nickel plating on the molybdenum member has a thickness between 0.000050 and 0.000100 inches.

11. A combination comprising:
    a metal member having a joinable surface;
    a ceramic member having a joinable surface; and
    a braze joint including a layer of bar stock type molybdenum between first and second layers of ductile material, the first ductile layer being brazed to the metal, the second ductile layer being brazed to the ceramic, a crystal axis of the molybdenum member being perpendicular to the joinable surfaces of the metal and ceramic members.

12. The combination of claim 11, wherein the first ductile layer is joined to the metal by a first braze having an after-brazing thickness of between about 0.003 and 0.006 inches; wherein the first and second ductile layers are joined to the molybdenum layer by second and third brazes having an after-brazing thickness of between about 0.005 and 0.008 inches; and wherein the second ductile layer is joined to the ceramic by a fourth braze having an after-brazing thickness of about 0.006 to 0.010.

13. The combination of claim 11, wherein the molybdenum member has a thickness of at least 0.005 inches.

14. The combination of claim 11, wherein the ductile members are made of nickel.

15. A turbomachine comprising:
    a ceramic rotating component;
    a metal rotating component; and
    a braze joint joining the ceramic component to the metal component, the braze joint including a member made of bar stock type molybdenum, a first ductile member brazed between the molybdenum member and the ceramic component, and a second ductile member brazed between the molybdenum member and the metal component;
    whereby the braze joint allows torque loads to be transmitted between the ceramic and metal rotating components.

16. The turbomachine of claim 15, wherein the first ductile member is joined to the metal component by a first braze having a thickness of between about 0.003 and 0.006 inches; wherein the first and second ductile members are joined to the molybdenum member by second and third brazes having a thickness of between about 0.005 and 0.008 inches; and wherein the second ductile member is joined to the ceramic component by a fourth braze having a thickness of about 0.006 to 0.010.

17. The turbomachine of claim 15, wherein a crystal axis of the molybdenum member is perpendicular to the joinable surfaces of the metal and ceramic members.

18. The turbomachine of claim 15, wherein the molybdenum member has a thickness of at least 0.005 inches.

19. The turbomachine of claim 15, wherein the ductile members are made of nickel.

* * * * *